F. A. PEARL.
RESILIENT VEHICLE WHEEL.
APPLICATION FILED MAR. 27, 1913.
1,081,551.
Patented Dec. 16, 1913.
2 SHEETS—SHEET 1.
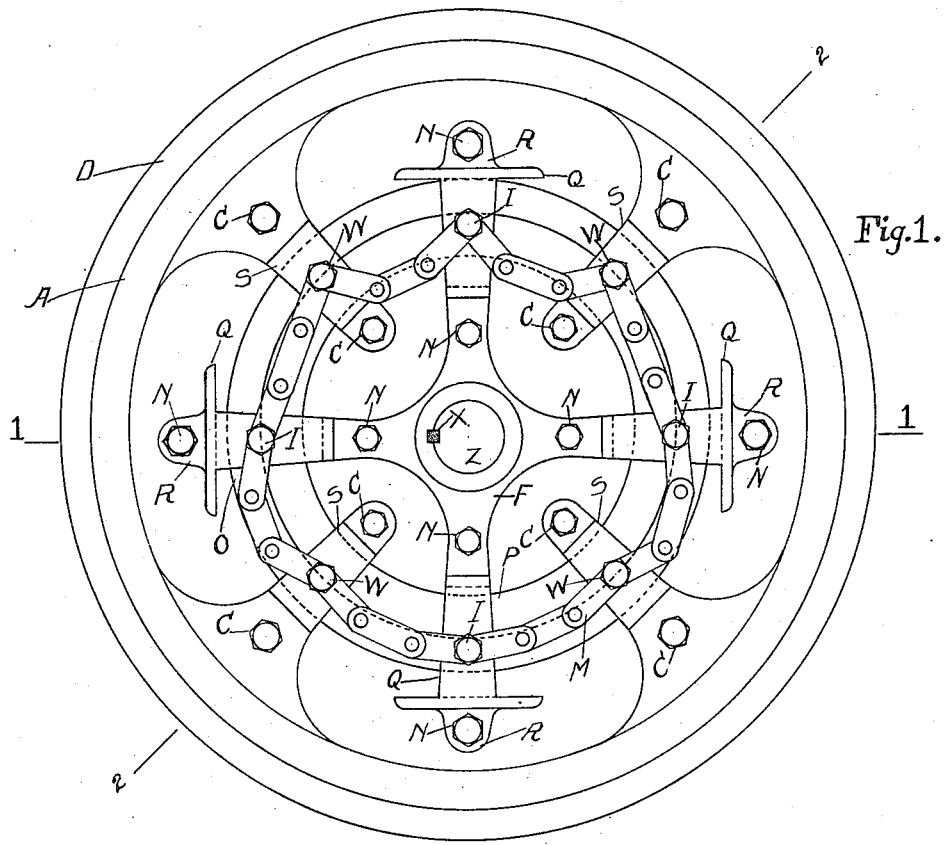
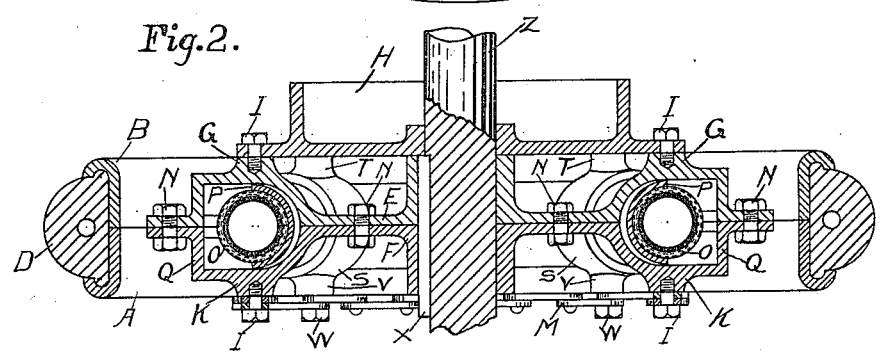
WITNESSES
W W French
Frances French
INVENTOR
Frank Alexander Pearl
BY
Charles Albert French
ATTORNEY
COLUMBIA PLANOGRAPH CO., WASHINGTON, D. C.

F. A. PEARL.
RESILIENT VEHICLE WHEEL.
APPLICATION FILED MAR. 27, 1913.

1,081,551.

Patented Dec. 16, 1913.
2 SHEETS—SHEET 2.

WITNESSES
W. W. French
Frances French

INVENTOR
Frank Alexander Pearl
BY
Charles Albert French
ATTORNEY

UNITED STATES PATENT OFFICE.

FRANK ALEXANDER PEARL, OF MADISON, WISCONSIN.

RESILIENT VEHICLE-WHEEL.

1,081,551. Specification of Letters Patent. Patented Dec. 16, 1913.

Application filed March 27, 1913. Serial No. 757,267.

*To all whom it may concern:*

Be it known that I, FRANK ALEXANDER PEARL, a citizen of the United States, residing at Madison, in the county of Dane and State of Wisconsin, have invented certain new and useful Improvements in Resilient Vehicle-Wheels, of which the following is a specification.

My invention relates to resilient vehicle wheels and it has for its object to provide a wheel with practically the same effect and results obtained by the ordinary pneumatic automobile wheel without the wear and expense occasioned by the pneumatic member being in contact with the road. I attain these objects by the mechanism illustrated in the accompanying drawings in which—

Figure 5:
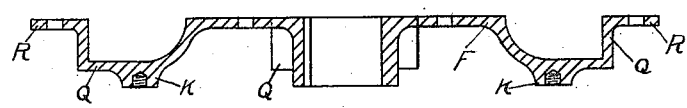
Figure 4:
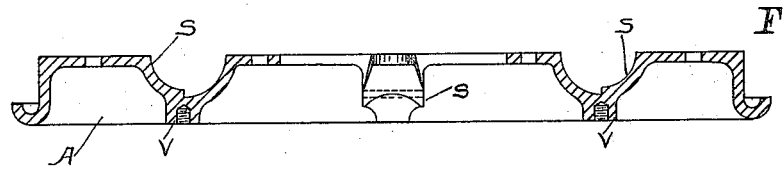
Figure 3:
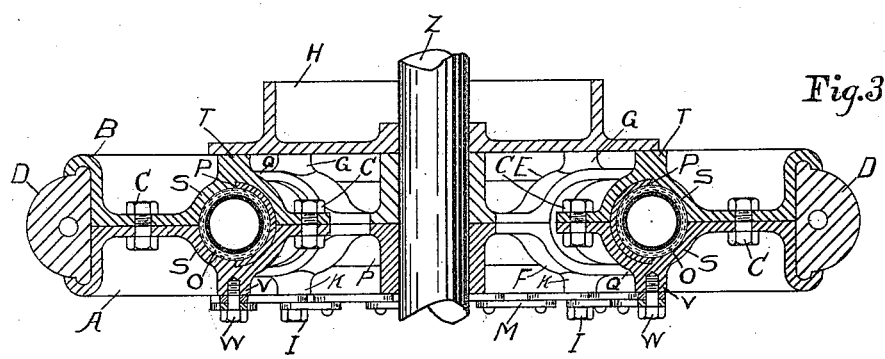

Figure 1, is a side elevation of my wheel complete, Fig. 2, is a horizontal section through line 1—1, Fig. 1. Fig. 3, is a sectional view on line 2—2, Fig. 1, Fig. 4, is a sectional view of the front half of outer rim and Fig. 5, is a sectional view of the front half of the hub member.

By referring to the drawings, Figs. 1 and 3, it will be seen that on the axle Z, there are mounted the two hub members E and F, which are duplicate castings preferably of cast steel, comprising a cylindrical hub integral with a web and four radial flat spokes, the said spokes adjacent their outer ends forming stirrups Q, and terminating in lugs, R. The aforesaid members E and F, are secured together by the bolts N. On the outside and opposite the center of the aforesaid stirrups Q, are the bosses G and K, threaded to secure a tap screw I, which secures the brake hub H to the member E, (see Fig. 2,) and the draft chain M to the member F.

Spaced from and extending there around the hub members and in vertical alinement therewith and comprising duplicate halves is a felly or rim member A, and B, consisting of an annular rim rolled inward from the outer edges forming, when together, two annular grooves for securing and retaining a solid rubber tire to the outside of said rim or felly. On the inside of said rim in spaced relation to each other are four flat spokes with semi-circular sections adjacent their inner ends forming clips S, for retaining a pneumatic member O, which consists of a single tube tire mounted on the outside of a metal rim P, the aforesaid clips S being adapted to conform to the shape of the tube O and rim P, so as to securely hold and clamp the said members together and in place by the bolts C.

On the outer member A, and inner member B, integral therewith and outside of the clips S, are bosses T, on the member B, faced on their outer ends to slide on the outer surface of the brake hub U, Fig. 3, and bosses V, on member A, faced and threaded to receive tap screws W, for attaching the draft chain M, thereto.

My wheel complete as a driver, comprises a brake hub U, mounted on the shaft Z, the hub member E, secured to said hub U, by the cap screws I; loosely disposed within the stirrups Q and the pneumatic member O within the stirrups Q and surrounding and attached to rim P; member T, secured to member E, by bolts N; the draft chain M, operatively connected to bosses K, by cap screws I; the said members E and F, secured to the shaft Z, by the key X; the felly or rim member A and B, spaced from and outside of the hub member and secured to the pneumatic member O, and outer tire D, by the bolts R and N, and connected to the draft chain M, on each third link by the tap screws W.

In operation, the tire resting upon the road, the pneumatic member secured to the spokes within the felly, and the hub loosely resting on the pneumatic tube at the stirrups and connected to the spokes by the draft chain, it is obvious that the wheel can be driven from the hub and the vehicle supported by the stirrups on top of the pneumatic tube with the same effect as though the pneumatic tube was on the road.

Having thus fully described my invention what I claim as new and my own is:

In a resilient vehicle wheel of the kind described, a hub member mounted on a shaft, four flat radial spokes terminating in stirrups integral therewith, a pneumatic rubber tube mounted on a metal rim loosely disposed within the said stirrups, an outer felly carrying a solid rubber tire on its periphery and four inwardly projecting flat spokes containing circular apertures near their inner ends, the aforesaid pneumatic rubber tube and metal rim passing through said apertures and securely fastened within the same, a chain consisting of twenty-four flat plates, every third plate hingedly secured to a stirrup or spoke of the outer rim alternately, substantially as described and set forth.

In testimony whereof I affix my signature in the presence of two witnesses.

FRANK ALEXANDER PEARL.

Witnesses:
W. W. FRENCH,
CHAS. A. FRENCH.

---

Copies of this patent may be obtained for five cents each, by addressing the "Commissioner of Patents, Washington, D. C."